United States Patent
Mehne et al.

(10) Patent No.: US 10,041,399 B2
(45) Date of Patent: Aug. 7, 2018

(54) EXHAUST GAS TURBOCHARGER WITH WEAR-FREE CONNECTION OF COMPONENTS OF ITS WASTEGATE SYSTEM

(71) Applicant: CONTINENTAL AUTOMOTIVE GMBH, Hannover (DE)

(72) Inventors: Georg Mehne, Wenzenbach (DE); Ivo Sandor, Regensburg (DE); Christoph Sparrer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/781,416

(22) PCT Filed: Apr. 22, 2014

(86) PCT No.: PCT/EP2014/058157
§ 371 (c)(1),
(2) Date: Sep. 30, 2015

(87) PCT Pub. No.: WO2014/173911
PCT Pub. Date: Oct. 30, 2014

(65) Prior Publication Data
US 2016/0053675 A1    Feb. 25, 2016

(30) Foreign Application Priority Data
Apr. 26, 2013  (DE) .......... 10 2013 207 677

(51) Int. Cl.
*F02B 37/18*    (2006.01)
*F16K 31/60*    (2006.01)

(52) U.S. Cl.
CPC .......... *F02B 37/186* (2013.01); *F16K 31/602* (2013.01); *F05D 2220/40* (2013.01); *Y02T 10/144* (2013.01)

(58) Field of Classification Search
CPC ........ F02B 37/186; F16K 31/602; F16K 1/20; F16K 1/2007; F16K 31/043; F16K 31/045; F16K 31/047; F16K 31/048
USPC ... 251/279, 280, 298, 301, 242–246, 77–83; 267/154–157; 60/324
See application file for complete search history.

(56) References Cited

U.S. PATENT DOCUMENTS

| | | | | |
|---|---|---|---|---|
| 1,470,583 A | * | 10/1923 | Messenger | F02M 1/00 251/313 |
| 1,627,220 A | * | 5/1927 | Withrow | F02M 1/02 267/155 |
| 1,637,761 A | * | 8/1927 | Butler | F16K 31/521 137/625.44 |
| 2,491,380 A | * | 12/1949 | Kutzler | F02B 37/183 417/21 |
| 2,621,917 A | * | 12/1952 | Landers | D03D 49/70 139/266 |

(Continued)

FOREIGN PATENT DOCUMENTS

| CN | 1386959 A | 12/2002 |
|---|---|---|
| CN | 101413432 A | 4/2009 |

(Continued)

*Primary Examiner* — Michael R Reid
(74) *Attorney, Agent, or Firm* — Laurence A. Greenberg; Werner H. Stemer; Ralph E. Locher

(57) ABSTRACT

An exhaust gas turbocharger includes a wastegate system. A control rod and a wastegate lever connected to the control rod by a connecting element belong to the wastegate system. The connecting element is a spring element.

16 Claims, 10 Drawing Sheets

(56) References Cited

U.S. PATENT DOCUMENTS

| | | | |
|---|---|---|---|
| 3,102,382 A | | 9/1963 | Bozzola |
| 3,270,951 A | | 9/1966 | Reed |
| 3,698,372 A | * | 10/1972 | Eshelman ............ F02M 19/128 123/198 D |
| 5,146,753 A | | 9/1992 | Potter |
| 5,172,552 A | | 12/1992 | Elpern et al. |
| 5,205,125 A | | 4/1993 | Potter |
| 6,525,412 B2 | * | 2/2003 | Noshita ............... H01L 23/3114 257/668 |
| 7,165,401 B2 | | 1/2007 | McEwen et al. |
| 7,451,854 B2 | * | 11/2008 | Suzuki ................... F01N 1/165 181/237 |
| 7,823,385 B2 | | 11/2010 | McEwen et al. |
| 8,327,635 B2 | * | 12/2012 | Hahnl ....................... F02D 9/04 251/129.02 |
| 8,701,408 B2 | | 4/2014 | Dettmann et al. |
| 9,297,297 B2 | | 3/2016 | Chu |
| 2003/0196435 A1 | | 10/2003 | Heath |
| 2006/0272322 A1 | * | 12/2006 | Abram ................... F01N 1/165 60/324 |

FOREIGN PATENT DOCUMENTS

| | | |
|---|---|---|
| CN | 102052144 A | 5/2011 |
| DE | 102007018618 A1 | 10/2007 |
| DE | 102009036914 A1 | 3/2011 |
| DE | 102010004559 A1 | 7/2011 |
| DE | 102010064041 A1 | 6/2012 |
| EP | 1256703 A2 | 11/2002 |
| KR | 101251536 B1 | 4/2013 |
| WO | 9310340 A1 | 5/1993 |

* cited by examiner

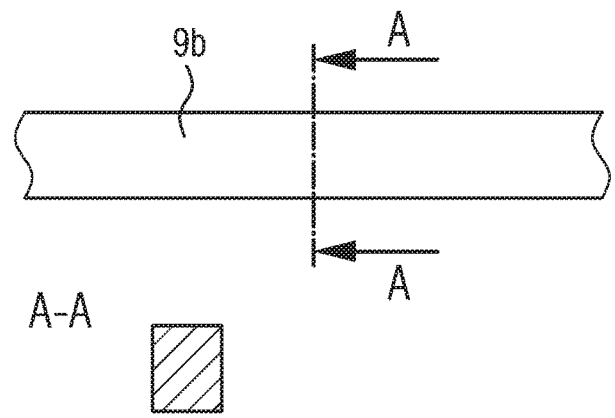
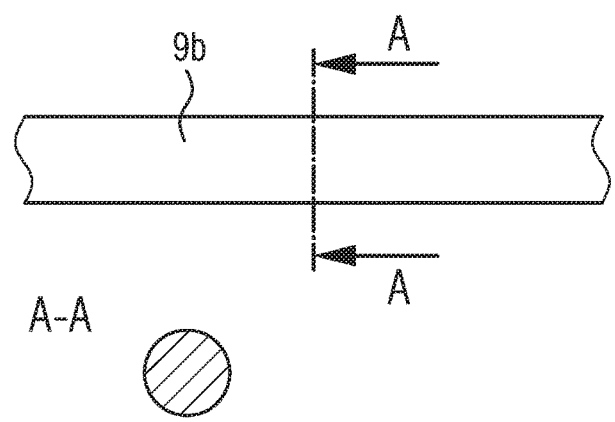
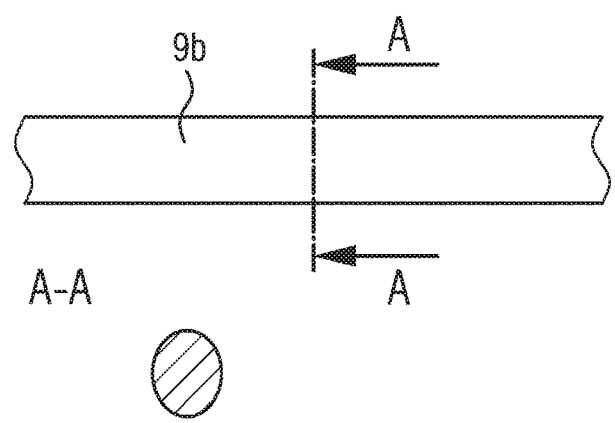

EXHAUST GAS TURBOCHARGER WITH WEAR-FREE CONNECTION OF COMPONENTS OF ITS WASTEGATE SYSTEM

BACKGROUND OF THE INVENTION

Field of the Invention

The invention relates to an exhaust gas turbocharger.

An internal combustion engine which is supercharged by an exhaust gas turbocharger is distinguished by the arrangement shown in FIG. 1 of the routing of fresh air and exhaust gases. In supercharged operation, the exhaust gas flows out of the internal combustion engine 1 via the turbine 2 which drives the compressor 3 in the intake section upstream of the inlet of the internal combustion engine via a common shaft 4. As a result of the compression of the intake air, more fuel can be metered in per cylinder stroke. As a result, the torque of the internal combustion engine is increased. Furthermore, in supercharged operation, the throttle valve 5 which is arranged between the compressor and the internal combustion engine is completely open. Furthermore, the arrangement which is shown in FIG. 1 has a thrust recirculating air valve 6 which, in its open state, connects the engine-side outlet of the compressor 3 to the inlet of the compressor.

Regulation of the supercharging can take place by way of part of the exhaust gas mass flow of the internal combustion engine being released by way of a wastegate system 7.

FIG. 2 shows a sectional illustration for explaining the wastegate system of a known exhaust gas turbocharger. Said sectional illustration shows the turbine housing 2a, in which the wastegate system 7 is arranged. An electric wastegate actuator 7a which is fastened to the compressor housing 3a by means of a holder belongs to said wastegate system 7. A core assembly 8, in which the shaft of the exhaust gas turbocharger is accommodated, is positioned between the turbine housing 2a and the compressor housing 3a.

FIG. 3a shows a sectional illustration of a plan view of the wastegate system 6, and FIG. 3b shows a sectional illustration of a side view of the wastegate system 6 of a known exhaust gas turbocharger.

FIG. 3b shows the bypass opening 2b of the turbine housing, which bypass opening 2b can be opened and closed using a wastegate valve 7b. As a result, part of the exhaust gas mass flow can be guided past the turbine wheel if required. The opening and closing actuation of the wastegate valve 7b takes place via a linear movement of a control rod 7c, which linear movement is initiated by the wastegate actuator. Said linear movement is transmitted via a connecting element 7d to a wastegate lever 7e. A wastegate spindle 7g which is mounted in a bush 7f transmits the rotational movement of the wastegate lever 7e to the wastegate valve 7b. A compensation joint 7h is provided on account of the linearly guided control rod 7c, in order to ensure offset compensation.

On account of the high temperatures in the region of the bearing points, the moving parts of the wastegate system are configured as plain bearings. The bearing plays which occur in the region of said bearing points are to be of correspondingly large dimensions on account of thermal expansions and manufacturing and mounting tolerances, in order to avoid jamming of the wastegate system. However, this leads to an undesirably great movability of all the components of the wastegate kinematics system, as soon as the tensile force of the wastegate actuator is canceled when the wastegate valve is open. A continual reversal of direction occurs here of the forces which prevail in the wastegate system and are caused by way of the exhaust gas pulses of the internal combustion engine on the wastegate valve. This leads to undesirable relative movements of the components of the wastegate system which are arranged within the play chain at the rhythm of the engine ignition frequency. Tests of the temporal course of a force measurement in the wastegate system during part load operation when the wastegate valve is open have confirmed that the wastegate kinematics system is subjected not only exclusively to a tensile load (positive forces), but rather that compressive forces (negative forces) and therefore load changes also occur. Said forces are influenced by a multiplicity of parameters, to which the diameter of the bypass opening, the engine operating point, the lever conditions of the wastegate kinematics system, the opening angle of the wastegate valve, the number of bearing points and the magnitude of the play at the bearing points belong.

Undesired wear of components of the wastegate system occurs on account of said load changes, which wear can lead to a delayed response behavior of the internal combustion engine up to a complete failure of the exhaust gas turbocharger. If increased wear occurs in the region of the wastegate spindle, untreated emissions can pass increasingly into the atmosphere, caused by the enlarged annular gap. This in turn has negative effects on boost pressure control, since a defined position of the wastegate valve cannot be set as the wear increases. This problem is increased further on account of the more frequent control interventions via the wastegate actuator which are caused as a result.

A further damage mechanism results from the continual contact between the wastegate valve and its valve seat if the exhaust gas turbocharger is operated over a relatively long time period with a slightly open wastegate valve. In this operating state, continually repeating contact between the wastegate valve and its valve seat occurs on account of the increased play between the components of the wastegate system, which contact makes itself noticeable by undesired chattering in the wastegate kinematics system. Furthermore, this leads to an undesired deformation of the sealing faces on the wastegate valve and on its seat. This results in increased leakage.

BRIEF SUMMARY OF THE INVENTION

It is the object of the invention to specify an exhaust gas turbocharger, in which the disadvantages which are specified above do not occur.

This object is achieved by way of an exhaust gas turbocharger having the following features. Said exhaust gas turbocharger has a wastegate system, to which a control rod and a wastegate lever which is connected to the control rod via a connecting element belong, the connecting element being a spring element.

Advantageous refinements and developments of the invention are specified in the dependent claims.

The advantages of the invention consist, in particular, in that wear is suppressed as a result of the use of a spring element as a joint-free and elastic connection between the wastegate lever and the control rod. Furthermore, shaking and chattering of the wastegate valve parts which are caused by pulse loading on the engine are suppressed by way of the tensioning of the elastically deformed connection.

BRIEF DESCRIPTION OF THE SEVERAL VIEWS OF THE DRAWING

Further advantageous properties of the invention result from its following exemplary explanation using FIGS. 4 to 7, in which:

FIGS. 6A-6G show a plurality of exemplary embodiments for the middle region of the spring element.

DESCRIPTION OF THE INVENTION

The present invention provides an exhaust gas turbocharger which has a wastegate system, to which a control rod and a wastegate lever which is connected to the control rod via a connecting element belong, the connecting element being configured as a spring element.

Said spring element preferably has a first end region, a middle region and a second end region, the first end region making contact with the wastegate lever and the second end region making contact with the control rod.

In said spring element, the first end region and/or the middle region and/or the second end region are/is advantageously of resilient configuration.

Figure 1:
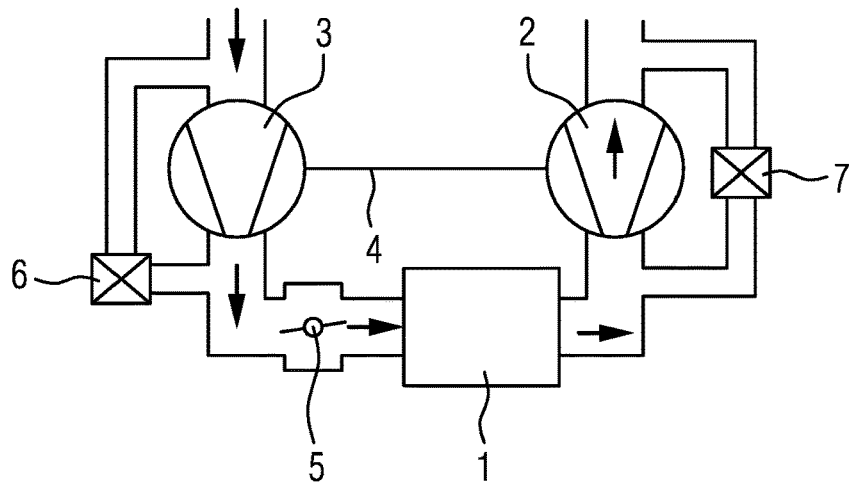
FIG. 1 shows a schematic diagram illustrating the routing of fresh air and exhaust gases.
Figure 2:
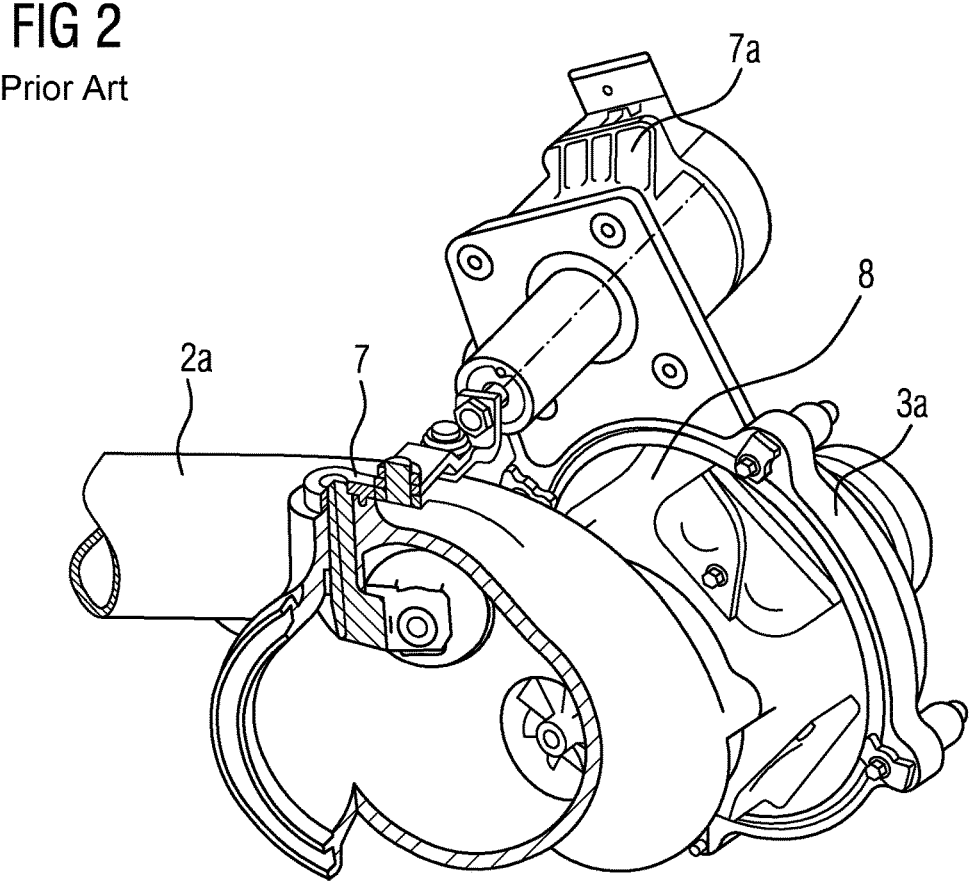
FIG. 2 shows a partly-sectional perspective illustration for explaining the wastegate system of an exhaust gas turbocharger.
Figure 3A:
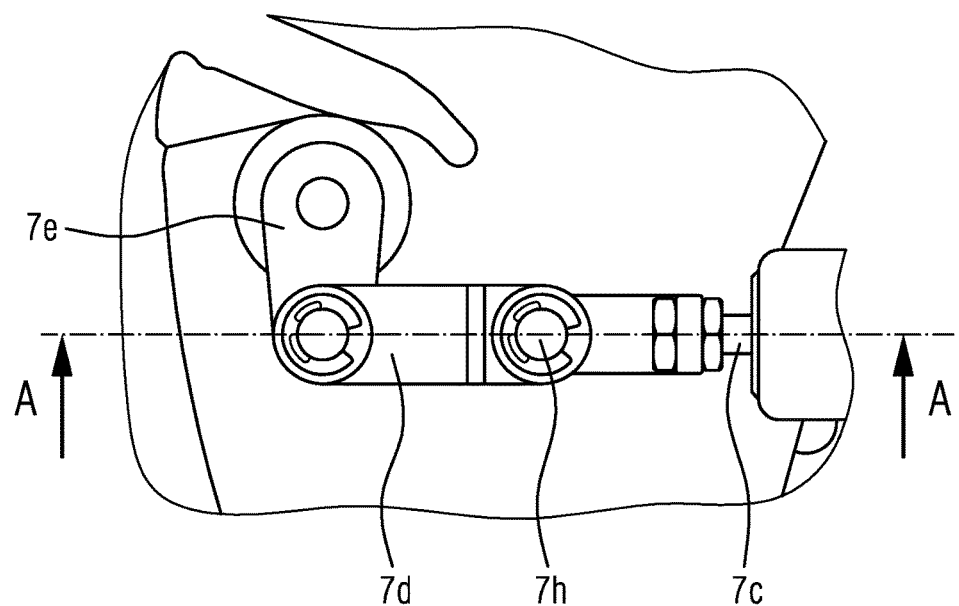
FIGS. 3A and 3B are respective plan and vertical-sectional illustrations of the wastegate system.
Figure 3B:
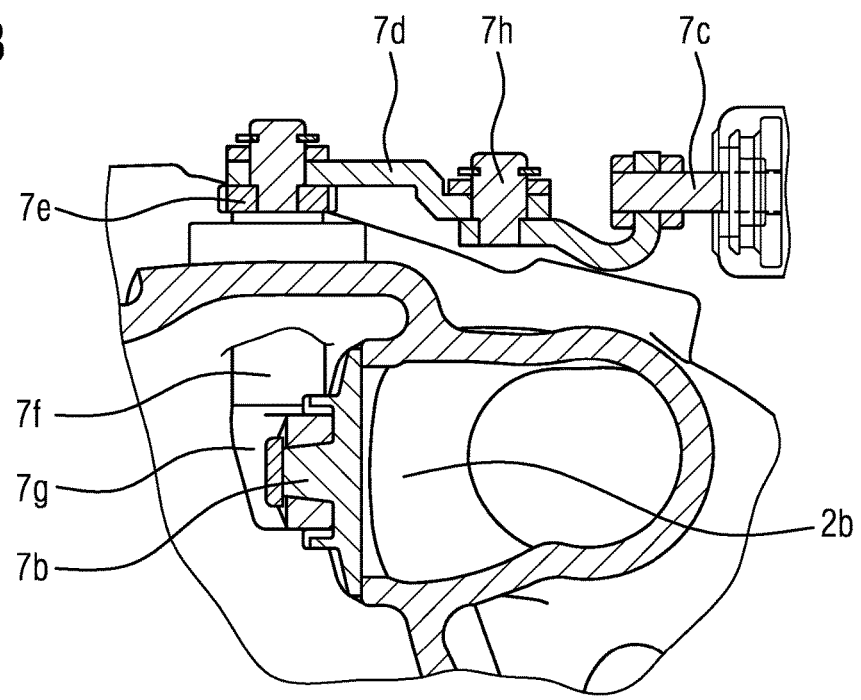
Figure 4:
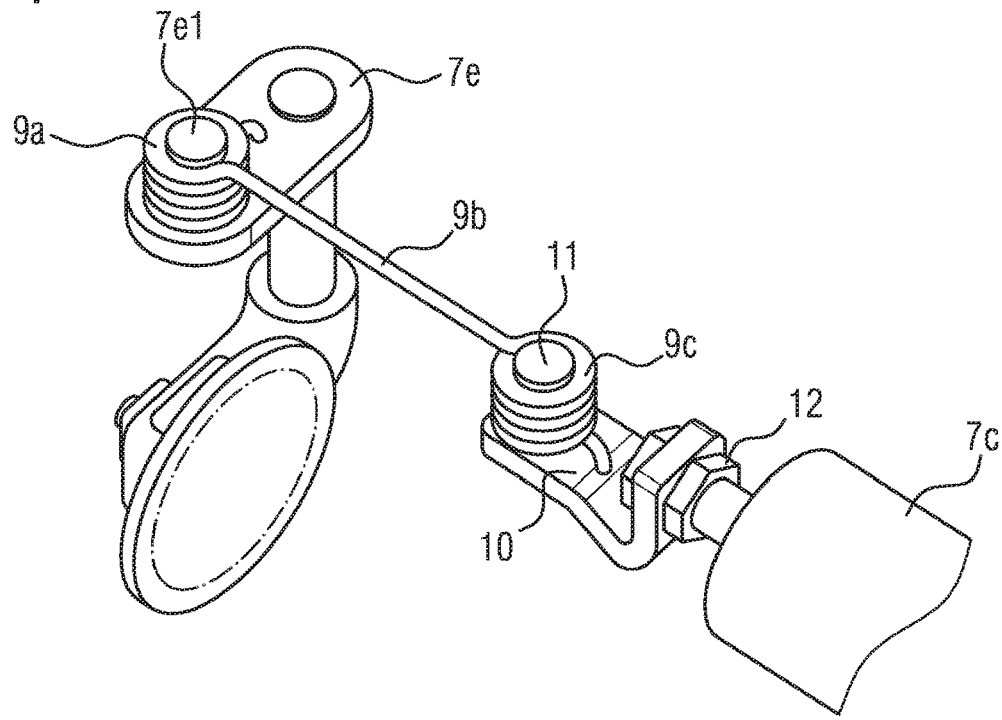
FIG. 4 shows a first exemplary embodiment for coupling of the control rod of the wastegate system to the wastegate lever using a spring element.
Figure 5A:
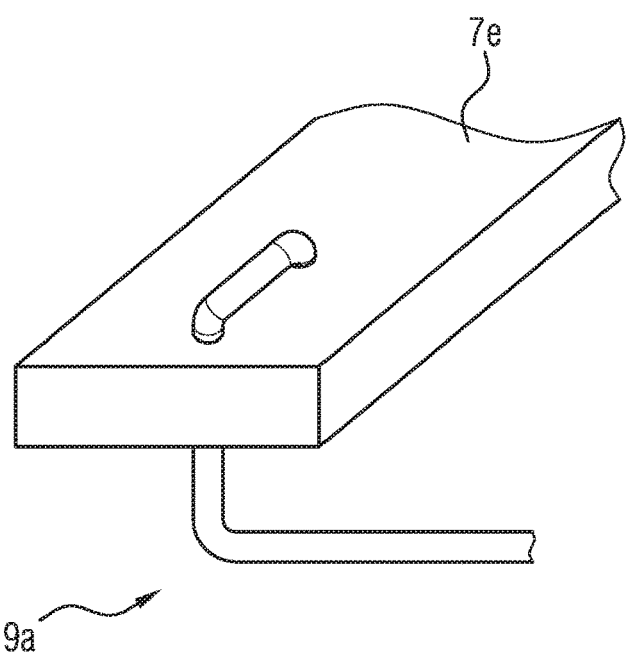
FIGS. 5A-5D show a plurality of exemplary embodiments for the configuration of the connecting point of the wastegate lever to the first end region of the spring element.
Figure 5B:
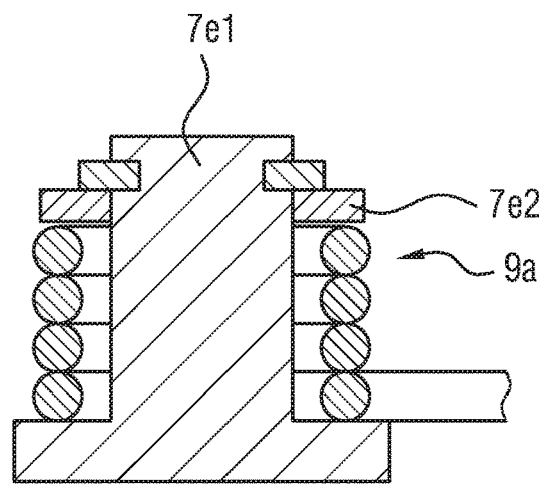
Figure 5C:
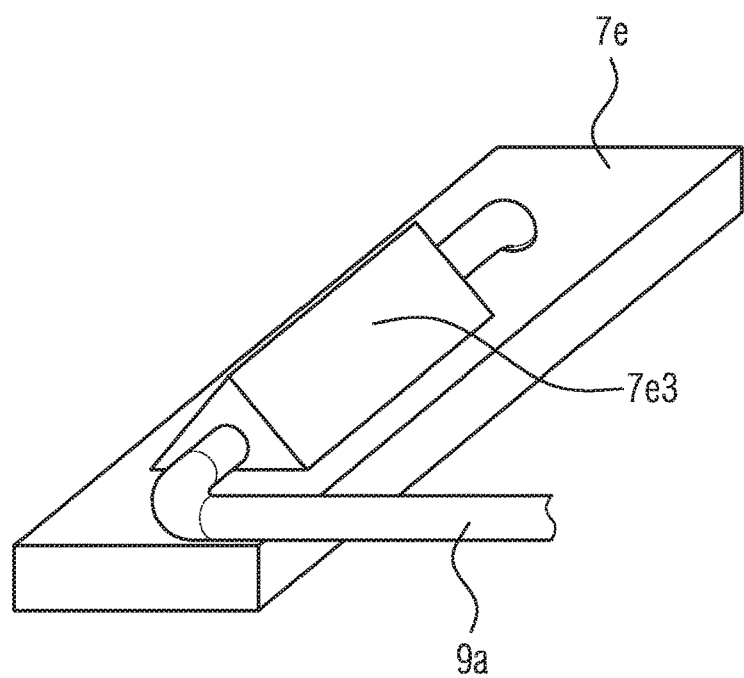
Figure 5D:
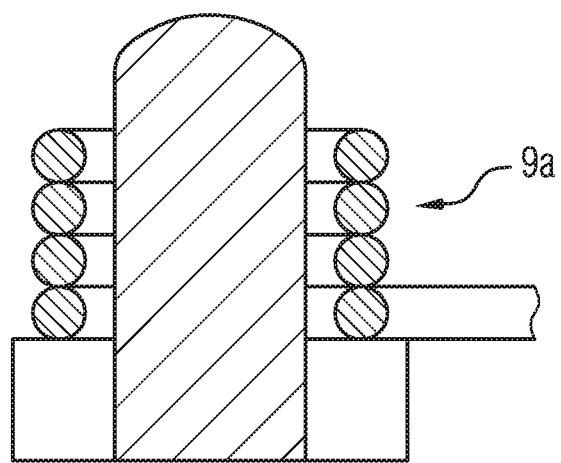
Figure 5D:
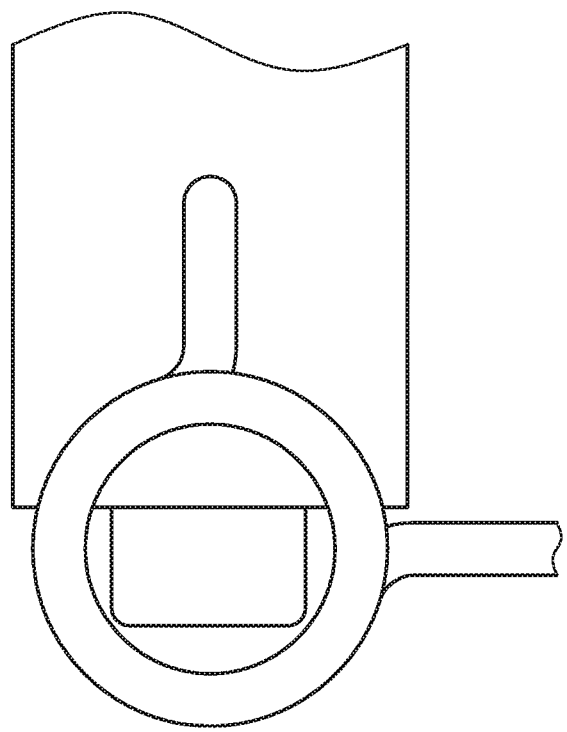
Figure 6A:
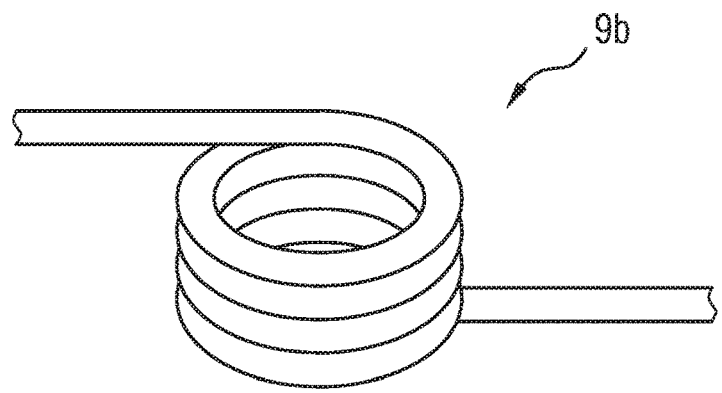
Figure 6B:
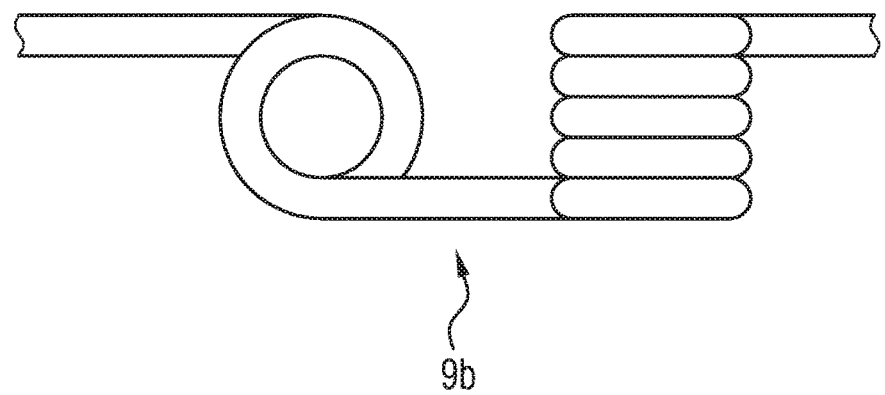
Figure 6C:
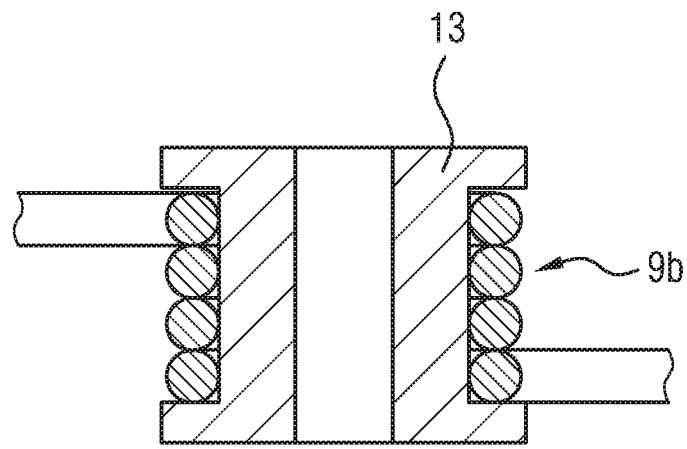
Figure 6D:
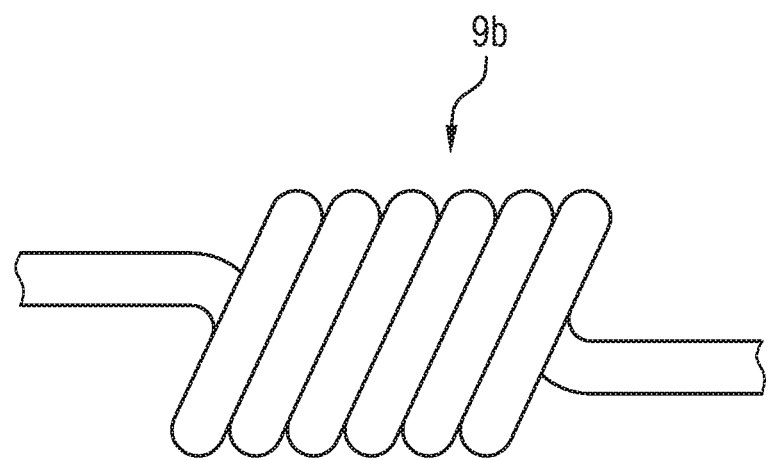
Figure 7A:
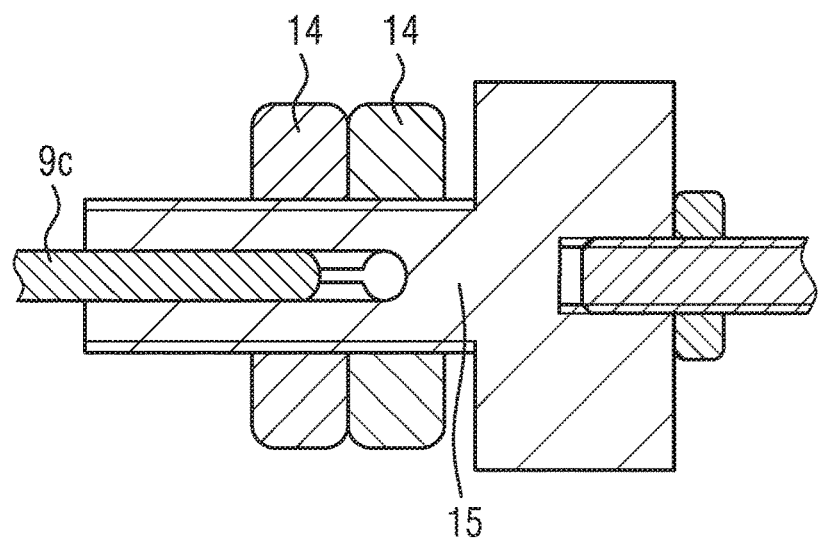
FIGS. 7A-7D show a plurality of exemplary embodiments for the configuration of the connecting point between the second end region of the spring element and the control rod.
Figure 7B:
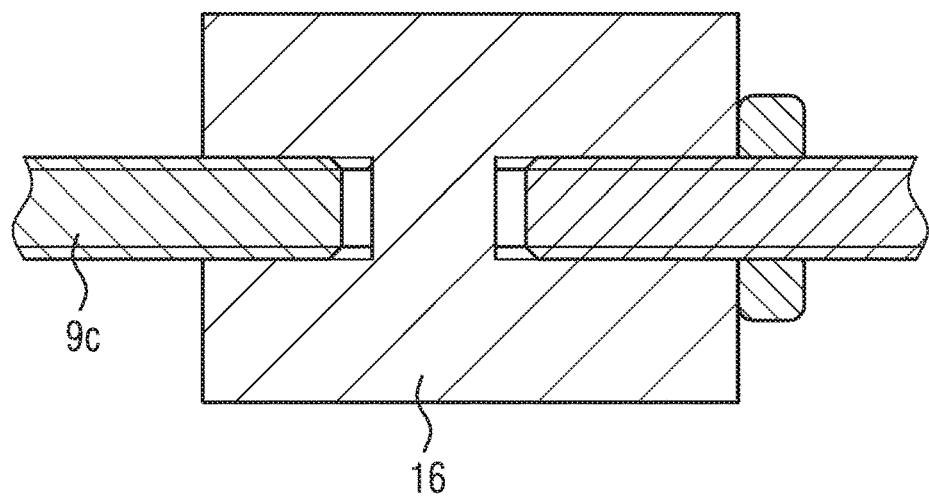
Figure 7C:
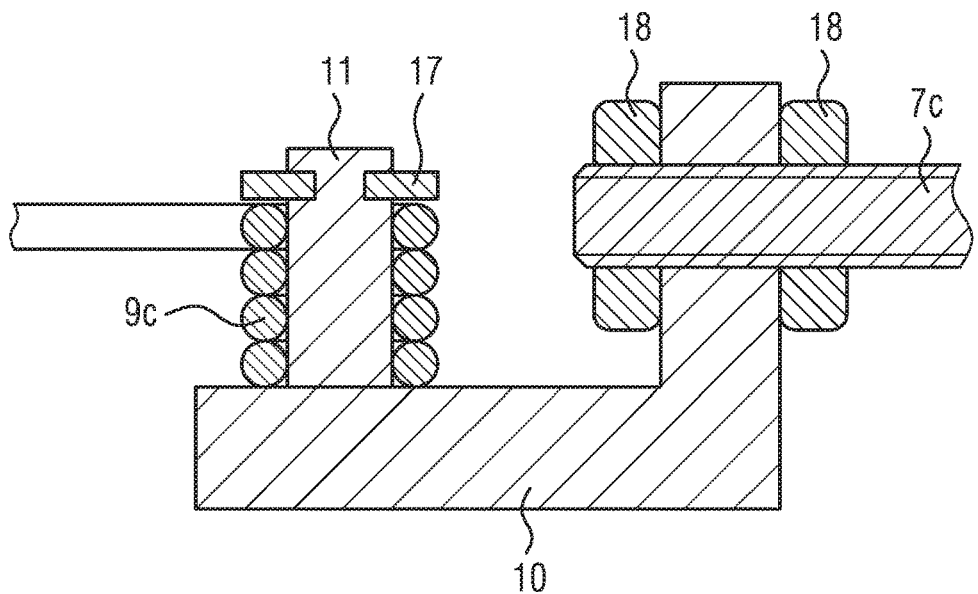
Figure 7D:
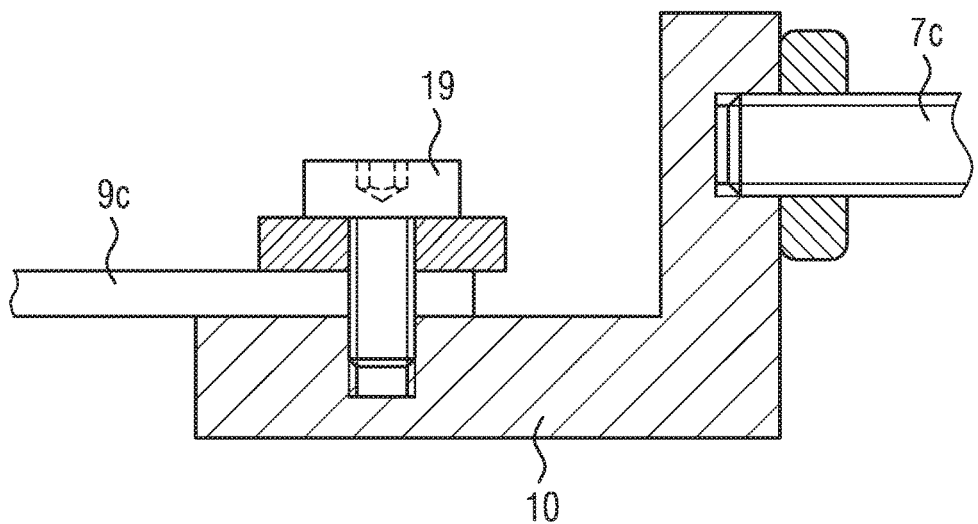

FIG. 4 shows a first exemplary embodiment of a coupling of the control rod 7c of the wastegate system of an exhaust gas turbocharger to the wastegate lever 7e using a spring element 9 which has a first end region 9a, a middle region 9b and a second end region 9c. In said first exemplary embodiment, the first end region 9a of the spring element 9 is configured as a torsion spring which is laid around a pin 7e1 of the wastegate lever 7e, said pin 7e1 extending perpendicularly upward starting from the wastegate lever 7e. On account of said configuration of the connecting point of the first end region 9a of the spring element 9 to the wastegate lever 7e, the required rotational degree of freedom is ensured. By way of the number of windings of the torsion spring, the diameter of the torsion spring and the thickness of the wire of the torsion spring, the restoring force of the spring element can be set in a desired way depending on the local deflection. In the exemplary embodiment which is shown in FIG. 4, the middle region 9b of the spring element is realized as a spring wire with a round cross-sectional area. The second end region 9c of the spring element 9 is configured as a torsion spring, just like the first end region 9a. Said torsion spring is laid around a pin 11 which extends perpendicularly upward starting from a contact plate 10. Said contact plate 10 is bent upward in its end region which faces away from the wastegate lever, and is connected fixedly to the control rod 7c in said upwardly bent region, for example by way of a screw connection 12.

FIG. 5 shows a plurality of exemplary embodiments for the configuration of the connecting point of the wastegate lever to the first end region of the spring element. In the exemplary embodiment which is shown in FIG. 5a, the first end region 9a of the spring element is configured as a bent wire piece which is guided through a bore of the wastegate lever 7e and the end of which is connected fixedly to the wastegate lever 7e. In the exemplary embodiment which is shown in FIG. 5b, the first end region 9a of the spring element is configured as a spiral spring which is laid around the pin 7e1 of the wastegate lever and is secured there against sliding out in the axial direction of the pin by means of a securing ring 7e2. In the exemplary embodiment which is shown in FIG. 5c, the first end region 9a of the spring element is configured as a bent wire piece which is guided through a punched-out wire guide element 7e3 which is positioned on the upper side of the wastegate lever 7e, the end of the wire being connected fixedly to the wastegate lever 7e. In the exemplary embodiment which is shown in FIG. 5d, the first end region 9a of the spring element is configured as a spiral spring which is arranged on a lever with an end which is bent upward.

FIG. 6 shows a plurality of exemplary embodiments for the middle region 9b of the spring element 9. In the exemplary embodiment which is shown in FIG. 6a, the middle region 9b of the spring element is realized as a single spiral spring which is connected via rectilinear wire pieces to the end regions of the spring element. In the exemplary embodiment which is shown in FIG. 6b, the middle region 9b of the spring element is realized as a multiple spiral spring which has two single spiral springs which are arranged with their longitudinal direction at a right angle with respect to one another. In the exemplary embodiment which is shown in FIG. 6c, the middle region 9b of the spring element is configured as a single spiral spring which is laid around a reinforcing sleeve 13. In the exemplary embodiment which is shown in FIG. 6d, the middle region 9b of the spring element is realized as a tension spring. In the exemplary embodiment which is shown in FIG. 6e, the middle region 9b of the spring element is configured as a spring wire with a rectangular cross-sectional area. In the exemplary embodiment which is shown in FIG. 6f, the middle region 9b of the spring element is realized as a spring wire with a round cross-sectional area. In the exemplary embodiment which is shown in FIG. 6g, the middle region 9b of the spring element is configured as a spring wire with an oval cross-sectional area.

FIG. 7 shows a plurality of exemplary embodiments for the connecting point of the second end region 9c of the spring element to the control rod 7c. In the exemplary embodiment which is shown in FIG. 7a, the second end region 9c of the spring element is realized as a wire piece which is fastened in a collet 15 using lock nuts 14. In the exemplary embodiment which is shown in FIG. 7b, the second end region 9c of the spring element is realized as a wire piece which is fastened in a threaded sleeve 16. In the exemplary embodiment which is shown in FIG. 7c, the second end region 9c of the spring element is realized as a spiral spring which is laid around a pin 11 of a contact plate 10 and is secured at the top by means of a securing ring 17, that end of the contact plate 10 which lies in the direction of the control rod 7c being bent over upward, and the control rod 7c being fastened to that end of the contact plate 10 which is bent over upward, using screws 18. In the exemplary embodiment which is shown in FIG. 7d, the second end region 9c of the spring element is realized as a wire piece which is fastened to a contact plate 10 using a clamping screw 19, that end of the contact plate 10 which lies in the direction of the control rod 7c being bent over upward, and the control rod 7c being fastened to that end of the contact plate 10 which is bent over upward. For example, that end of the contact plate 10 which is bent over upward has a bore, into which the control rod 7c is screwed.

The exemplary embodiments which are shown above using FIGS. 4, 5, 6 and 7 for the configuration of the first end region 9a, the middle region 9b and the second end region 9c of the spring element 9 can largely be combined with one another as desired.

In light of the foregoing, the invention provides an exhaust gas turbocharger, to which a control rod and a wastegate lever which is connected to the control rod via a connecting element belong, the connecting element being a spring element. Said spring element forms a joint-free and elastic connection between the wastegate lever and the control rod, by way of which connection wear of the components of the wastegate system is prevented. Furthermore, shaking and chattering of the wastegate valve caused by the above-described pulse loading is avoided by way of the tensioning of the elastically deformable connection. The described connection according to the invention between the wastegate lever and the control rod also has the advantage that joints which are susceptible to play and wear and are required in known exhaust gas turbochargers in order to provide all required degrees of freedom can be dispensed with.

The use of a spring element as a connecting element between the wastegate lever and the control rod ensures the necessary elasticity which is required to provide all necessary degrees of freedom in the entire actuating range of the wastegate valve. Secondly, the use of the spring element as a connecting element between the wastegate lever and the control rod ensures a stiffness which is such that an exact transmission of the actuating forces which occur can take place in the direction of the actuating stroke, without buckling or undesired expansions occurring. An offset during opening of the wastegate valve and incorrect positions which occur on account of tolerances and thermal expansions of the components which are arranged between the control rod and the wastegate lever can be compensated for in all spatial directions by way of an elastic deformation of the spring element. The connection can therefore be configured without play.

Furthermore, constraining forces can be introduced in a targeted manner into the wastegate system by way of a tensioned installation of the spring element, on account of which constraining forces the presence of play between the wastegate spindle and the bush is ruled out even when the wastegate valve is open. This also has a positive effect with regard to a prevention of the occurrence of wear.

The invention claimed is:

1. An exhaust gas turbocharger, comprising:
   a wastegate system having a moveable control rod, a bush, a wastegate spindel mounted in said bush, a wastegate lever connected to said wastegate spindle, a wastegate valve connected to said wastegate spindle, and a connecting element interconnecting said control rod and said wastegate lever;
   said connecting element being a spring element installed in a tensioned manner for introducing constraining forces in a targeted manner into said wastegate system for ruling out play between said wastegate spindle and said bush even when said wastegate valve is open; and
   said control rod extending along an axis, said spring element having a portion formed as a torsion spring wound around a central axis extending perpendicularly with respect to said axis of said control rod;
   wherein said central axis, around which said torsion spring is wound, is laterally offset from a central axis of said wastegate spindle.

2. The exhaust gas turbocharger according to claim 1, wherein said spring element has a first end region, a middle region and a second end region, said first end region makes contact with said wastegate lever, said second end region is connected to said control rod, and said portion is defined by a region selected from the group consisting of said first end region, said middle region, and said second end region.

3. The exhaust gas turbocharger according to claim 2, wherein at least one of said regions has a resilient construction.

4. The exhaust gas turbocharger according to claim 2, wherein said first end region has:
   a torsion spring,
   a curved wire, or
   a spiral spring.

5. The exhaust gas turbocharger according to claim 2, wherein said middle region has:
   a single spiral spring,
   a multiple spiral spring,
   a spiral spring laid around a reinforcing sleeve,
   a tension spring,
   a spring wire with a rectangular cross-sectional area,
   a spring wire with a round cross-sectional area, or
   a spring wire with an oval cross-sectional area.

6. The exhaust gas turbocharger according to claim 2, wherein said second end region has:
   a torsion spring,
   a wire piece inserted into a collet, or
   a wire piece inserted into a threaded sleeve,
   a spiral spring or
   a wire piece fixed by a clamping screw.

7. The exhaust gas turbocharger according to claim 1, wherein: said wastegate valve is actuated by a movement of said control rod, via said connecting element, said wastegate lever and said wastegate spindle.

8. The exhaust gas turbocharger according to claim 1, wherein said spring element has an elastic deformation and said spring element is configured to compensate for, in all spatial directions, an offset during opening of said wastegate valve and incorrect positions that occur on account of tolerances and thermal expansions of at least one component located between said control rod and said wastegate lever.

9. The exhaust gas turbocharger according to claim 8, wherein said at least one component includes said connecting element.

10. The exhaust gas turbocharger according to claim 1, wherein: said spring element has a first end region formed as a torsion spring, a second end region formed as a torsion spring, and a middle region that linearly extends in an uncoiled manner between said first end region and said second end region; and said portion is defined by a region selected from the group consisting of said first end region and said second end region.

11. An exhaust gas turbocharger, comprising:
   a wastegate system having a moveable control rod, a bush, a wastegate spindel mounted in said bush, a wastegate lever connected to said wastegate spindle, a wastegate valve connected to said wastegate spindle, and a connecting element interconnecting said control rod and said wastegate lever;
   said connecting element being a spring element installed in a tensioned manner for introducing constraining forces in a targeted manner into said wastegate system for ruling out play between said wastegate spindle and said bush even when said wastegate valve is open;
   said control rod extending along an axis, said spring element having a portion formed as a torsion spring wound around an axis extending perpendicularly with respect to said axis of said control rod; and said spring element having a first end region formed as a torsion spring, a second end region formed as a torsion spring, and a middle region that linearly extends in an uncoiled manner between said first end region and said second end region; and said portion is defined by a region selected from the group consisting of said first end region and said second end region.

12. The exhaust gas turbocharger according to claim 11, wherein said first end region makes contact with said wastegate lever, and said second end region is connected to said control rod.

13. The exhaust gas turbocharger according to claim 12, wherein at least one of said regions has a resilient construction.

14. The exhaust gas turbocharger according to claim 11, wherein: said wastegate valve is actuated by a movement of said control rod, via said connecting element, said wastegate lever and said wastegate spindle.

15. The exhaust gas turbocharger according to claim 11, wherein said spring element has an elastic deformation and said spring element is configured to compensate for, in all spatial directions, an offset during opening of said wastegate valve and incorrect positions that occur on account of tolerances and thermal expansions of at least one component located between said control rod and said wastegate lever.

16. The exhaust gas turbocharger according to claim 15, wherein said at least one component includes said connecting element.

* * * * *